June 14, 1960     J. H. MURPHY ET AL     2,940,794
VEHICULAR WHEEL

Filed Nov. 17, 1959                                   4 Sheets-Sheet 1

INVENTOR.
JOHN H. MURPHY
MARVIN A. HOLE.
BY WATTS & EDGERTON

ATTORNEYS

June 14, 1960

J. H. MURPHY ET AL 2,940,794

VEHICULAR WHEEL

Filed Nov. 17, 1959

INVENTOR.
JOHN H. MURPHY
BY MARVIN A. HOLE
WATTS & EDGERTON
A H Edgerton
ATTORNEYS June 14, 1960  J. H. MURPHY ET AL  2,940,794
VEHICULAR WHEEL Filed Nov. 17, 1959  4 Sheets-Sheet 3

INVENTOR.
JOHN H. MURPHY
BY MARVIN A. HOLE.
WATTS & EDGERTON
ATTORNEYS

June 14, 1960
J. H. MURPHY ET AL
2,940,794
VEHICULAR WHEEL
Filed Nov. 17, 1959
4 Sheets-Sheet 4
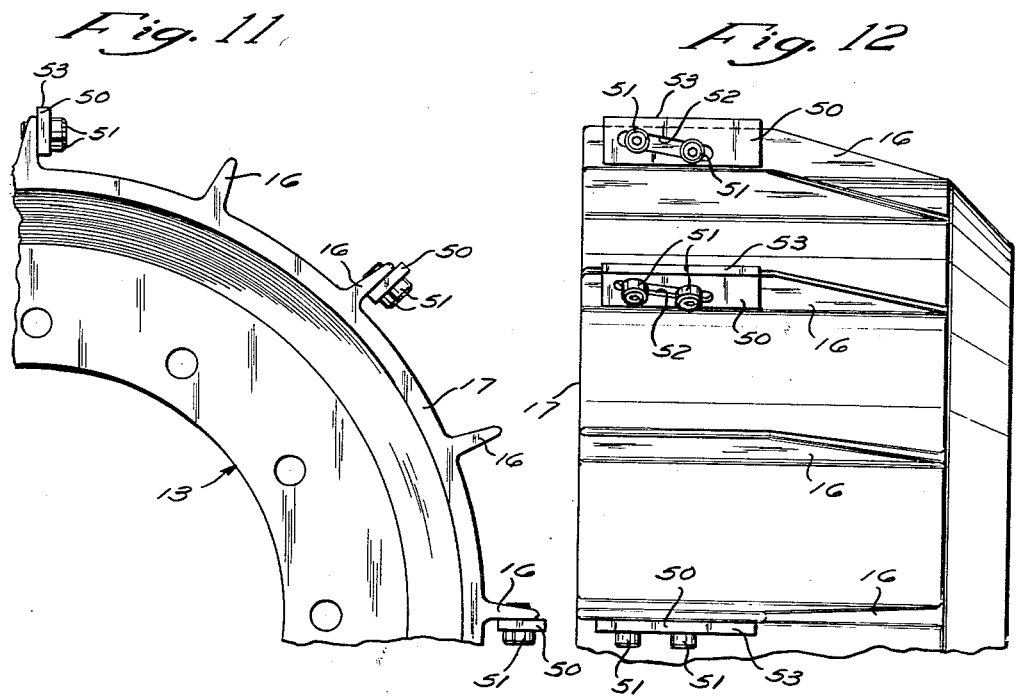
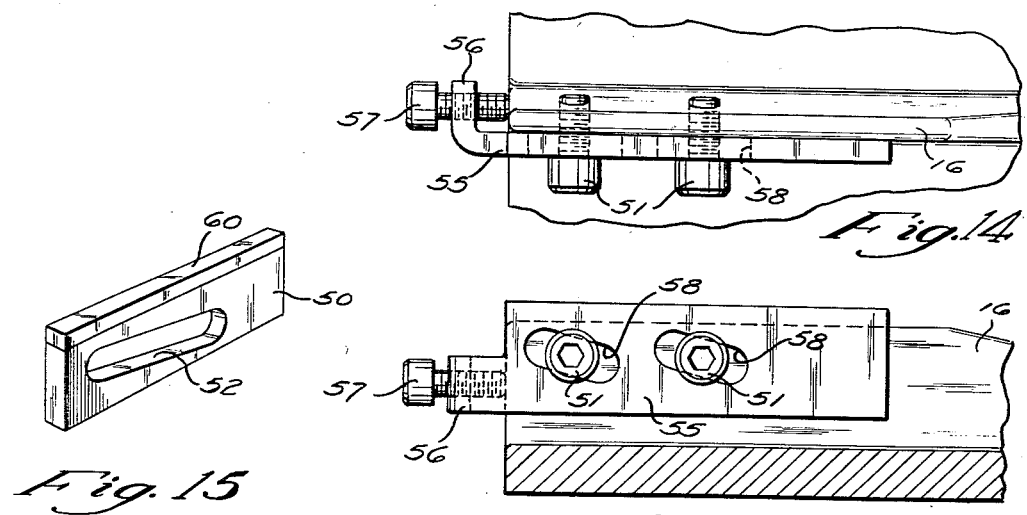
INVENTORS
JOHN H. MURPHY, &
MARVIN A. HOLE
BY
WATTS & EDGERTON
ATTORNEYS United States Patent Office
2,940,794
Patented June 14, 1960

2,940,794

VEHICULAR WHEEL

John H. Murphy, 1124 Hibbard St., Detroit, Mich., and Marvin A. Hole, 27709 Bentley St., Livonia, Mich.

Filed Nov. 17, 1959, Ser. No. 855,251

9 Claims. (Cl. 301—6)

This invention relates generally to vehicular road wheels and more particularly to such wheels having brake drums which are subjected to high temperature use.

Wheels have been devised heretofore in which means were provided for inducing the flow of cooling gases between the brake drum and rim. The cooling which occurs in such wheels is of questionable value particularly where the drums are subjected to the high heat conditions resulting from long continued application of the brakes or application of the brakes under extremely high pressures. Where the brake drums are highly heated they expand and the expansion often results in distortion of the drums with resultant decrease in the area of contact of the brakes with the drums and fading of the braking effect. The same results are caused by the application of extremely high pressures to the brakes and thence to the drums. This condition creates a vicious cycle in which the decrease in area of contact results in greater and localized heating of the drum and more fading and more distortion. Such high heating of the drums also often causes checking of the inside surfaces of the drums due to the temperature differential between the inner and outer surfaces of the drums and the resulting high differential between the tensile forces and compression forces present in the outer and inner parts of the drum.

The present invention aims to avoid the foregoing, and other well known, disadvantages of the prior art and achieves that invention by providing a wheel in which the brake drum is free to expand and contract without substantial warpage at normal operating temperatures, in which adjustment may be made to permit greater expansion of the drum to take place without distortion of the drum due to engagement of the drum with the rim, in which the amount of heat transferred from the drum to the rim may be minimized, in which vibration of the drum may be dampened and noises produced by the brakes and drum may be minimized, and in which the wheel hub and brake drum may be assembled in the rim quickly and inexpensively.

The present invention will be better understood by those skilled in the art from the drawings accompanying and forming a part of this specification in which:

Figure 11 is a fragmentary end elevational view, similar to Figure 1, showing a modified form of this invention.

Figure 12 is a side elevational view of the device of Figure 11.

Figure 13 is a side elevational view of a modified form of adjusters.

Figure 14 is a top plan view of the adjuster of Figure 13; and

Figure 15 is a perspective view of an adjuster with a layer of heat insulation on the rim engaging the edge thereof.

Figure 1:
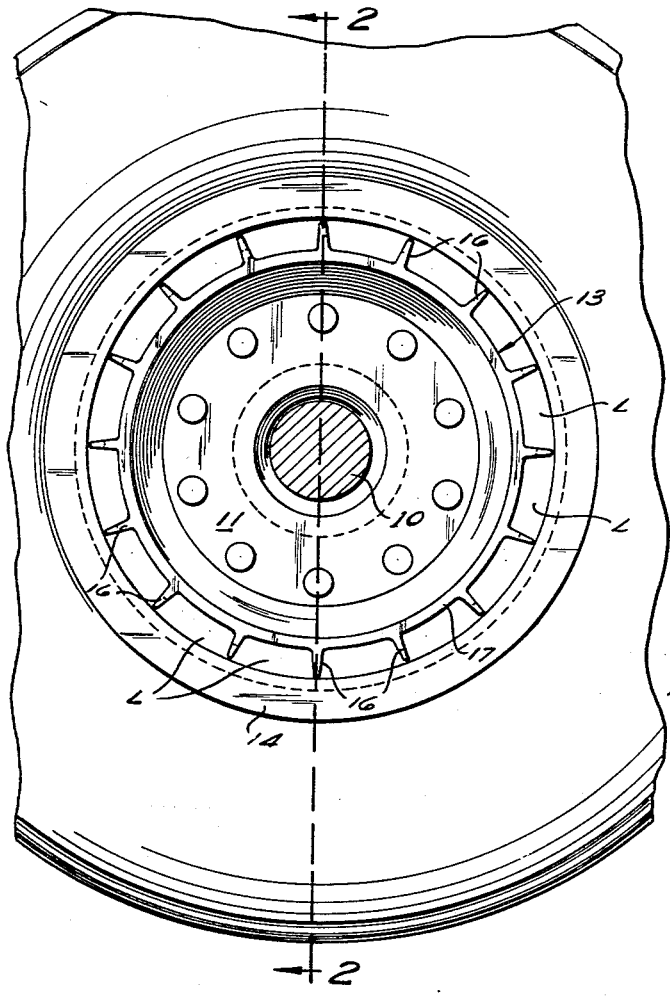
Figure 1 is a fragmentary front elevational view of a wheel having a tire rim thereon, a brake drum attached thereto with concentric ribs on the circumferential face thereof which constitute louvers for cooling the brake drum and wheel.
Figure 2:
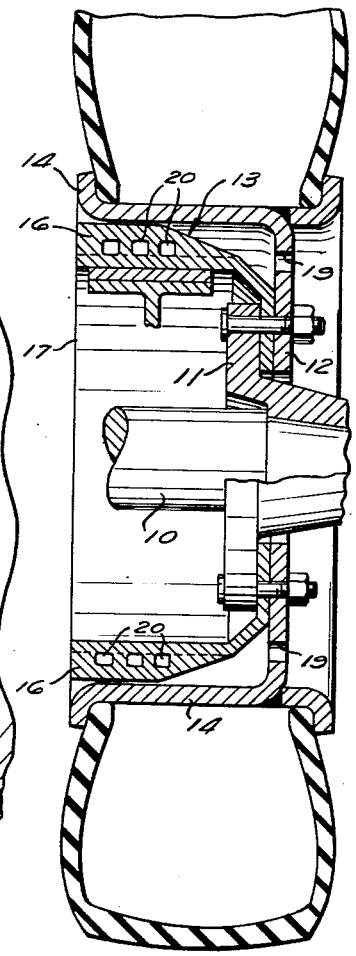
Figure 2 is a vertical section through the wheel assembly of Figure 1, the second being taken on a plane indicated by the line 2—2 in Figure 1.
Figure 3:
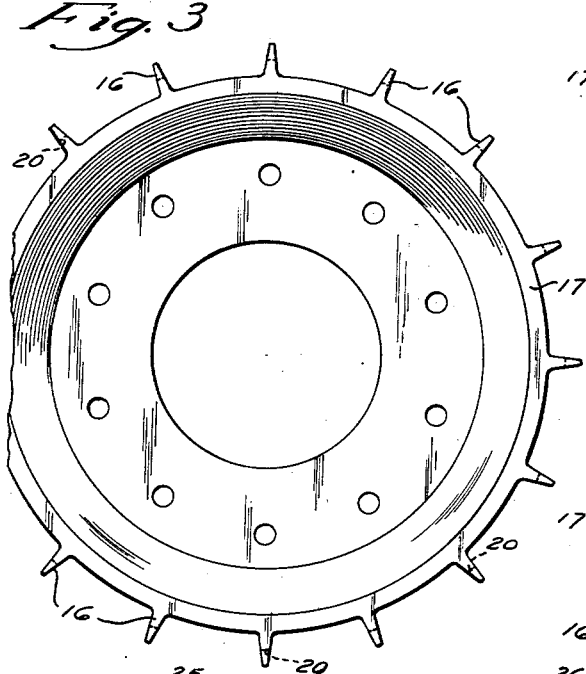
Figure 3 is an enlarged front elevational view of the brake drum of Figure 1 illustrating the disposition of the ribs.
Figure 4:
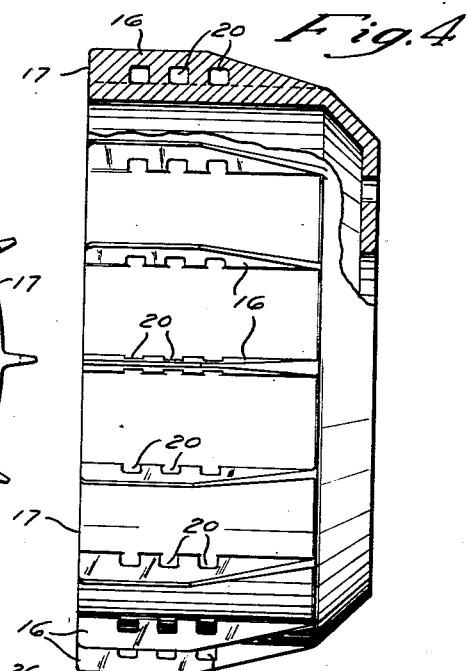
Figure 4 is a side elevational view partially in section, of the brake drum illustrated in Figure 3.

Referring first to Fig. 1, the wheel comprises an axle shaft 10, a drive flange 11 therefor which is drilled for the support of a wheel flange 12, a brake drum 13, and a tire rim 14. The circumferential face of the brake drum is formed with a plurality of spaced ribs 16 disposed in biased relation to the axis of rotation of the drum, and arranged with the inner face 17 of each rib flush with the edge of the drum. The circumferential face of the ribs is slightly smaller than the internal diameter of the tire rim 14; thus the ribs, in combination with the rim, form a plurality of louvers L for the circulation of air over and about the periphery of the brake drum. The tire rim 14 is concentric with the outer diameter of the ribs 16, the dimensional difference between the inner face of the rim and the face of the drum at the root of the ribs being approximately one and one quarter inch on each side of the assembly. The ribs 16 may be formed integral with the drum on a casing or, if desired, a pressed steel brake drum may be used and separate channeled ribs may be welded on the face thereof. The crests of the ribs on the brake drum are machined to provide a diametrical clearance of approximately forty-thousandths of an inch between the outer diameter of the ribs and the inner diameter of the rim, in order to accommodate expansion of the drum. The wheel is formed with spaced openings 19 therein aligned with the passageways defined by the ribs to facilitate the circulation of air through the drum and wheel assembly.

It will be understood that the foregoing dimensions of one and one quarter inch and .040 of an inch are given by way of illustration only and that other suitable dimensions may be employed as desired.

As illustrated in Figs. 1, 2, 3 and 4, the brake drum comprises a flanged disc with parallel ribs 16 disposed on the circumferential face of the flange in parallel relation with the center of rotation of the brake drum. The ribs are formed with transverse openings 20 therein to increase the agitation of the air that flows through the louvers L and over the face of the brake drum.

Figure 5:
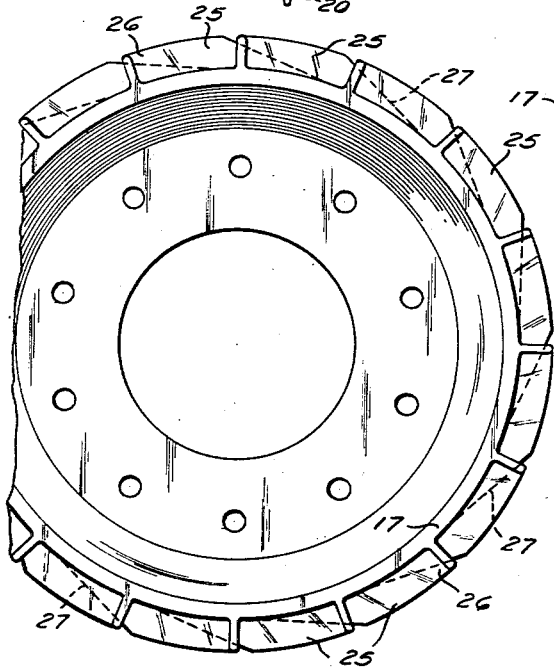
Figure 5 is a plan view of a modified form of the brake drum illustrating a substitutive form of the louvers.
Figure 6:
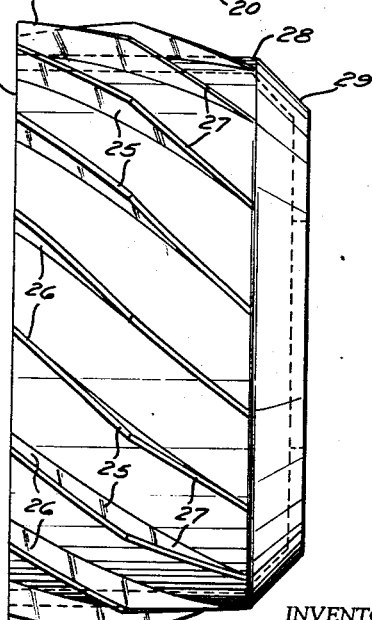
Figure 6 is a side elevational view thereof.

In the modified form illustrated in Figs. 5 and 6, the ribs 25 are disposed in spaced relation with each other on the circumferential face of the brake drum and in diagonal relation to the axis of rotation of the drum. The ribs are further formed with the inner ends 26 thereof machined concentrically and with the outer ends 27 tapered from the center of the width of the drum downwardly to the root of the ribs and terminating adjacent the larger end 28 of the beveled inner end 29 of the drum.

Figure 7:
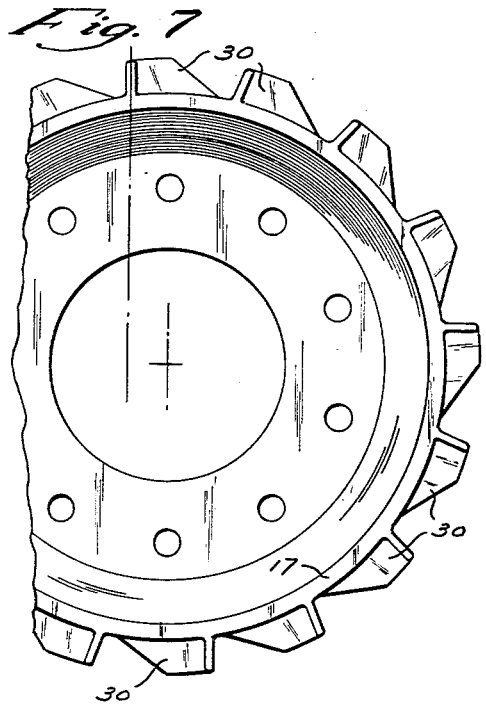
Figure 7 is a front elevational view of another modified form of the brake drum.
Figure 8:
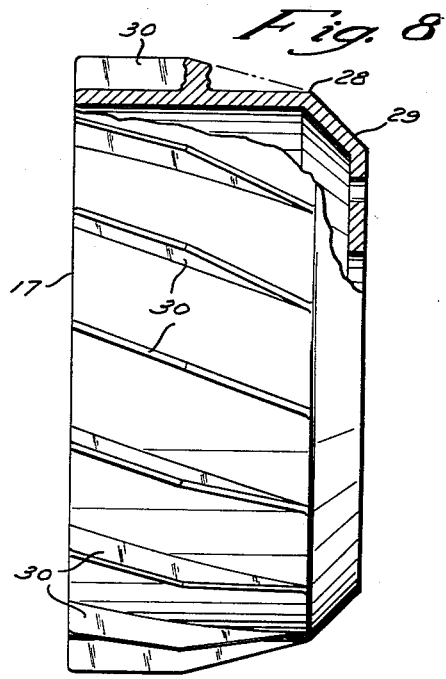
Figure 8 is a side elevational view, partially in section, of the brake drum illustrated in Figure 7.
Figure 9:
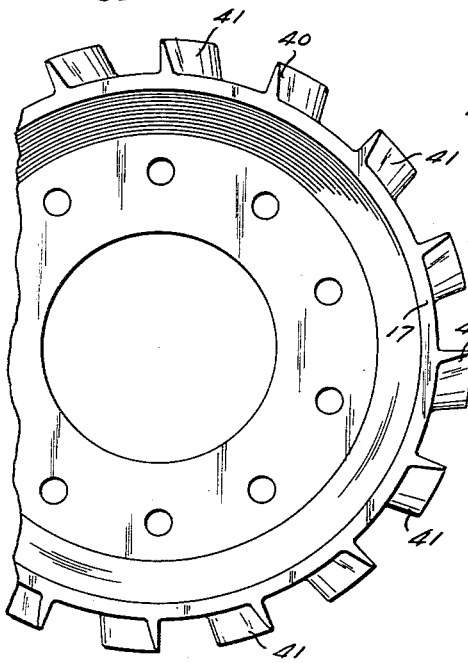
Figure 9 is a front elevational view of still another modified form of the brake drum.

As shown in Figs. 7 and 8, the ribs 30 are of similar configuration to the ribs described in Figs. 5 and 6, save only that the ribs 30 are not radial as indicated by the center lines shown in Fig. 7.

Figure 10:
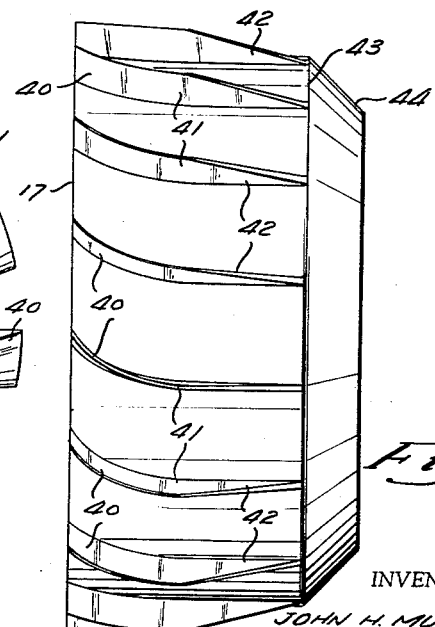
Figure 10 is a side elevational view thereof.

In the form illustrated in Fig. 10, the inner end portions 40 of the ribs 41 are of arcuate configuration relative to the axis of rotation of the drum, but the height of the forward portion of the ribs is equal. The rearward halves 42 of the ribs 40 are however, substantially parallel with each other and parallel with the axis of rotation of the hub. The rearward portions 42, are, moreover, tapered outwardly and terminate in the outer edge 43 of the beveled wall 44 of the drum.

Each set of ribs as described above, considered in combination with the tire rim 14, define louvers that will scoop up ambient air about the drum and increase the velocity of the flow thereof as it passes over the brake drum and through the wheel.

The drum louvers are primarily adapted for use in wheels for trailers, though they are not necessarily limited to such use. When a trailer reaches its terminal port, the brake drums thereof are customarily extremely hot and when the tractor is uncoupled from the trailer, the brakes are automatically applied. In the absence of the drum louvers and the clearance between the crest of the ribs as referred to above, the brake shoes will distort the hot brake drums and eventually effect the eccentricity thereof and develop cracks or disintegration of the drum.

The improved wheel construction disclosed herein will not only avoid the deleterious effect of heat on the brake drum, but will also safeguard the tire and prevent vulcanization of the bead of the tire to the rim, since the tire rim will also be cooled by the air circulated through the louvers during the operation of the vehicle.

Modified forms of the present invention are shown in Figures 11 to 15 inclusive. These modifications involve the use of adjusters on certain of the ribs 16 to facilitate assembly of the hub and drum with a rim and means to minimize the amount of heat transferred by the ribs from the drum to the rim.

In Figures 11 and 12 several of the spaced ribs 16 are equipped with adjusters in the form of elongated bars 50. These bars are secured to the ribs by means of cap screws 51 which extend through inclined slots 52 in the bars and are threaded into ribs 16. It will be understood that when the hub and drum assembly is to be assembled in a rim these adjusters are preferably so positioned that their outer edges 53 are located only slightly beyond the edges of the ribs to which they are attached, and that after the hub and drum have been assembled in the rim the adjusters are moved endwise inwardly and, by reason of engagement of the bolts 51 in the inclined holes 52, the adjusters are thereby moved radially out toward the rim, after which the cap screws may be tightened to lock the adjusters in adjusted position.

When the adjusters 50 are used the ribs 16 may have a smaller outside diameter than in the modification shown in Figures 1 to 10 and hence assembly of the hub drum in the rim is facilitated by reason of this greater clearance. After assembly, the adjusters 50 may be adjusted radially outwardly to provide clearances of almost any desired dimension and thus clearances may be so obtained which would be so small as to interfere with the ready assembly of the hub and rim if the ribs were not provided with adjusters.

A modified form of adjuster is shown in Figures 13 and 14 where each adjuster 55 is in the form of a bar which lies alongside of a rib 16 and has an end 56 bent to overlap the outer end of the rib. A screw 57 is threaded through end 56 and bears against the outer end of rib 16. Cap screws 51 similar to those shown in Figures 11 and 12 extend through the bars 55 and into threaded openings in ribs 16 for securing the bars 55 in adjusted position. Each bar 55 has inclined openings 58 through which the cap screws 51 extend and by means of which the bars are positioned relative to the ribs 16.

By adjusting cap screws 57 in ends 56 of bars 55 so that the inner ends of the screws bear against the outer ends of ribs 16, each bar 55 may be locked in its adjusted position.

In Figure 15 means is shown for impeding the flow of heat from adjusters 50 or 55 to the opposed surface of the rim. In this figure the adjuster 50 is provided with a layer of heat insulating or poor heat conducting material 60. This material which may take the form of Bakelite, asbestos brake lining plastic material or any other suitable material is attached to the outer edge of the bar 50 as by bonding or in any other suitable or conventional manner.

It will be understood that in all the modifications of the present invention disclosed herein provision is made for ready assembly of the hub and brake drum in the rim and that initially a small clearance exists between the outer edges of the ribs on the exterior of the drum and the inner surface of the rim. Preferably, this clearance is sufficient to permit the drum to expand in response to the normal, low, operating temperatures attained by the drum in ordinary driving. Such expansion of the drum will bring the edges of the ribs into contact with the inner surface of the rim without resulting in any distortion of the drum. When the drum becomes heated above such normal low, operating temperatures, as may result from long application of the brakes or the brakes are applied under heavy pressure, the resulting expansion of the drum will be uniformly opposed by the rim without distortion of the drum.

Thus, limited expansion of the drum may occur without marked restraint or distortion of the drum taking place and when greater expansion of the drum occurs it will be uniformly restrained by the rim and hence not distorted to an objectional extent. As stated above, the bars 50 and 55 make it possible not only to assemble the drum and rim expeditiously, but also to vary the spacing between the ribs on the drum and the rim depending on the type of service to which the wheels will be subjected. For example, if the wheels are to be used on mountain roads, where the brakes will be applied for long periods of time or under high pressure or both, the initial clearance may be greater than would be desirable where the truck was to travel on fairly level roads. Furthermore, the adjusters make it possible to employ heat insulating material when it is desired and by the simple and relatively inexpensive expedient of putting the insulating material on the adjusters.

Since the brake drum is free to expand and contract in a wide temperature range and is backed up by engagement of its ribs with the rim, it need not be made as thick as has been customary.

The difference between the temperature of the outer and inner surfaces will be smaller with the thinner drum and the differential between the tensile stresses and the compression stresses on the outer and inner portions of the band will be smaller with the thinner drum. This invention which makes it possible to use thinner brake drums also tends to preserve the smoothness of the inner surface of the drum and less wear on the brake lining results.

The adjusters not only facilitate the assembly of the hub and brake drum unit in a rim because of the greater clearance which they permit between the outer edges of the ribs and the inner surface of the rim, which clearance is taken up by adjustment of the adjusters after assembly, but also act as dampeners when they are in contact with the rim and thereby eliminate drum vibration and squeal incident thereto. Since noise is a serious problem in public conveyances the noise-reducing result of the adjusters is of considerable practical importance.

This application is a continuation-in-part of application Serial No. 825,490, filed July 7, 1959, now abandoned.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A vehicular wheel comprising a tire rim and a brake drum concentrically mounted therein, the drum having a plurality of circumferentially spaced ribs extending outwardly toward the rim with their outer edges lying on a circle whose diameter is such that under normal, low, operating temperatures of the drum the ribs will be out of contact with the rim and under normal, high, operating temperatures of the drum the ribs will be in engagement with the rim.

2. The combination of elements set forth in claim 1 in which the ribs are disposed substantially parallel to the axis of rotation of the drum.

3. The combination of elements set forth in claim 1 in which the ribs are disposed at an angle to the axis of rotation of the drum and form a plurality of channels constituting louvers for the circulation of air over the drum.

4. The combination of elements set forth in claim 1 in which the ribs have openings extending therethrough at approximately right angles to the axis of rotation of the drum to facilitate circulation of air over the drum.

5. The combination of elements set forth in claim 1 in which the inner end portions of the ribs are of arcuate configuration relative to the axis of rotation of the drum and in which the outer or rearward portions of the ribs are substantially parallel to the axis of the drum.

6. A vehicular wheel comprising a tire rim, a brake drum mounted concentrically within the rim and having a plurality of circumferentially spaced ribs extending outwardly toward the rim, adjusters attached to certain of said ribs and means for positioning the adjusters so that there will be a small clearance between their outer surfaces and the rim under normal, low, operating temperatures of the drum and no clearance under higher temperatures of the drum.

7. The combination of elements set forth in claim 6 in which the adjusters are provided with inclined elongated openings and cap screws extend through said openings and are threaded into the adjacent rib.

8. The combination of elements set forth in claim 6 in which the adjusters have body portions to lie along the ribs and end portions to extend across the ends of the ribs, and cap screws threaded in said ends of the bars and bearing against the ends of the ribs to adjust the bars relative to the ribs.

9. The combination of elements set forth in claim 6 in which the outer edges of the adjusters are provided with heat insulating material.

References Cited in the file of this patent

UNITED STATES PATENTS

| | | |
|---|---|---|
| 1,906,520 | Bode | May 2, 1933 |
| 1,912,789 | Norton | June 6, 1933 |
| 2,740,502 | Butterfield | Apr. 3, 1956 |